Jan. 11, 1966  YAO T. LI ETAL  3,228,248
PRESSURE TRANSDUCER
Filed Nov. 23, 1962

INVENTORS
YAO T. LI
SHIH Y. LEE
BY
Ezekiel Wolf, Wolf + Greenfield
ATTORNEYS 3,228,248
PRESSURE TRANSDUCER
Yao T. Li and Shih Ying Lee, South Lincoln, Mass.
(both c/o Dynisco, 42 Carlton St., Cambridge, Mass.)
Filed Nov. 23, 1962, Ser. No. 239,419
7 Claims. (Cl. 73—398)

This invention relates to pressure transducers and more particularly comprises a diaphragm-type pressure transducer of improved linearity.

In the development of pressure transducers having greater linearity manufacturers have explored many avenues for maintaining the effective area of the pressure pick-up constant for they have recognized that linearity of performance requires that the effective area be a constant value if special compensating features are to be avoided. Examples of developments made in this area to achieve constant effective area may be found in the prior application of Yao T. Li, Serial Number 851,375, filed November 6, 1959, now abandoned, and in our copending application Serial Number 239,518, now abandoned, filed of even date herewith.

An important object of this invention is to achieve in a relatively simple structural form a linear pressure transducer.

A more specific object of this invention is to provide a pressure transducer that renders a signal which is a function of the displacement of only a selected portion of its diaphragm-type pickup, and which portion has a constant effective area.

Another important object of this invention is to effectively isolate the area of the pressure pickup being sensed from strains applied to the transducer frame.

To accomplish these and other objects the pressure transducer of this invention includes among its features a frame closed at one end by a thin and flexible diaphragm supported inwardly of its periphery by inner and outer spaced elastic restraining members whose elastic constants bear the same mathematical relationship to the effective areas of the diaphragm supported by each. Thus, the two elastic members deflect the same amount under all levels of pressure, and the effective area of the portion of the diaphragm supported by the inner member remains constant. As a result the deflection of the inner member bears a linear relationship to the pressure exerted upon the diaphragm, and by measuring the deflection of the inner member the value of the pressure may be determined.

These and other objects and features of this invention along with its incident advantages will be better understood and appreciated from the following detailed description of one embodiment thereof, selected for purposes of illustration and shown in the accompanying drawing, in which.

Figure 1:
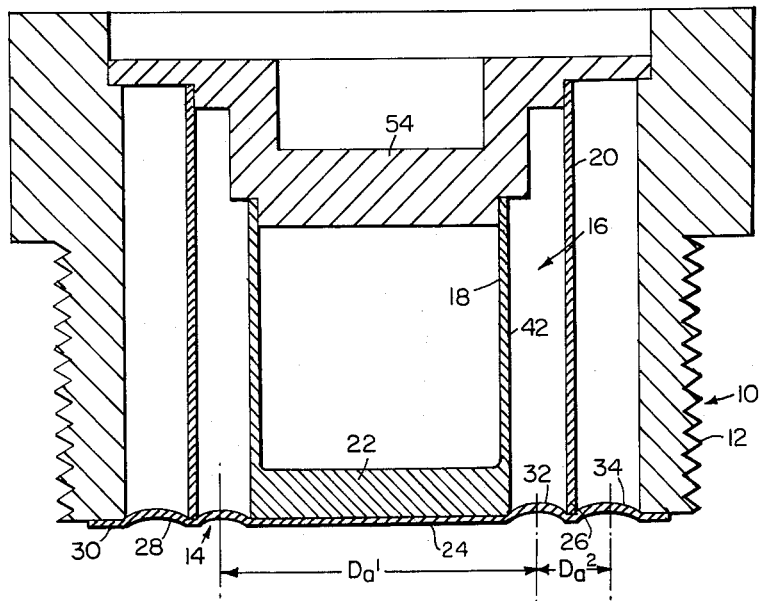
FIG. 1 is an enlarged cross-sectional view of a pressure transducer constructed in accordance with this invention.

The transducer shown in FIG. 1 includes a case or frame 10 threaded externally at its lower end 12, a diaphragm-type pressure pickup 14 and a signal general 16.

The diaphragm-type pickup 14 extends across the bottom and closes the lower end 12 of the frame 10, and the diaphragm periphery 30 is welded, brazed or otherwise secured to the frame. The diaphragm which is relatively thin and flexible and yet capable of withstanding the extreme conditions to which it may be subjected is supported inwardly of its periphery by two separate elastic restraining members 18 and 20 that in the embodiment shown take the form of a pair of strain tubes. The lower portion of the elastic member 18 is closed by a plate 22 which in turn provides a flat support for the central portion 24 of the diaphragm 14. The central portion 24 of the diaphragm is welded, brazed or otherwise secured to the plate 22 to prevent radial displacement of the diaphragm with respect to the plate 22 of elastic member 18.

The second elastic restraining member 20 is concentric with and disposed between the first elastic member 18 and the frame 10, and the lower end 26 of the member 20 is welded, brazed or otherwise secured to the annular portion 28 of the diaphragm between the frame and first member.

Figure 2:
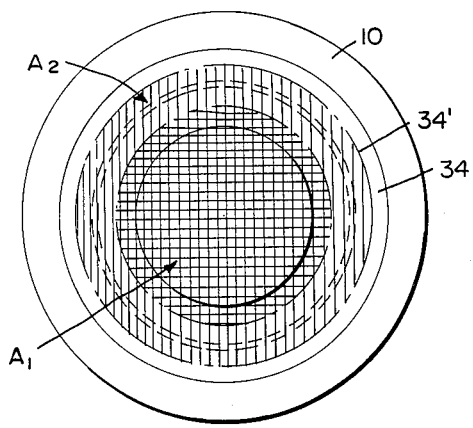
FIG. 2 is a diagrammatic bottom view of the transducer shown in FIG. 1.

When pressure is applied to the lower surface of the diaphragm 14 the diaphragm moves upwardly in the frame 10 as the elastic members 18 and 20 deflect. If the effective area of the diaphragm 14 against which the pressure is exerted to cause deflection of the restraining members is a constant value, then the deflection of the members is proportional to the pressure exerted upon the diaphragm. However, if the effective areas of the portions of the diaphragm supported by the restraining members change, then a linear relationship will not exist between deflection and pressure. The diameter of the effective area of that portion of the diaphragm 14 which applies a loading force upon the strain tube 18 is designated $D_a^1$ in FIG. 1, and the limits of that diameter are defined by the line of deepest penetration of the dished portion 32 of the diaphragm between the elastic members 18 and 20. The span of the effective area of that portion of diaphragm 14 which loads the outer elastic member 20 is designated in FIG. 1 as $D_a^2$, which radially extends from the limit of $D_a^1$ to the point of deepest penetration of the dished portion 34 between the elastic member 20 and the wall of the frame 10. In FIG. 2 the respective areas $A_1$ and $A_2$ which load the members 18 and 20 are represented by different shading.

Because the points of deepest penetration of the two dished portions 32 and 34 determine the limits of the effective areas of the two portions of the diaphragm, it will be appreciated that the profiles of those portions must remain unchanged to achieve constant areas for those portions. But the profile of the outer dished portion 34 cannot remain constant if diaphragm displacement is to take place. In accordance with the present invention the profile of the dished portion 32 is maintained constant so as to establish a constant effective area $A_1$ for the inner elastic member 18. This is achieved by establishing the same ratio between the elastic constant (spring rate) $K_1$ of the elastic member 18 and its diaphragm effective area $A_1$ and the elastic constant $K_2$ of the outer elastic member 20 and its diaphragm effective area $A_2$. That is, the design criteria of the transducer in accordance with this invention is:

$$K_1/A_1 = K_2/A_2$$

Since the deflection of each of the elastic members is equal to $pA/k$ (when $p$ is the pressure applied to the diaphragm) the design criteria assures that the two elastic members 18 and 20 have the same deflection under all pressure loads. Therefore, the profile of the diaphragm at the dished portion 32 which determines the limits of the effective area $A_1$ of the diaphragm remains unchanged. As a result the deflection of the inner elastic member 18 bears a linear relationship to the pressure applied to the diaphragm, as the factors A and K are constant.

Figure 3:
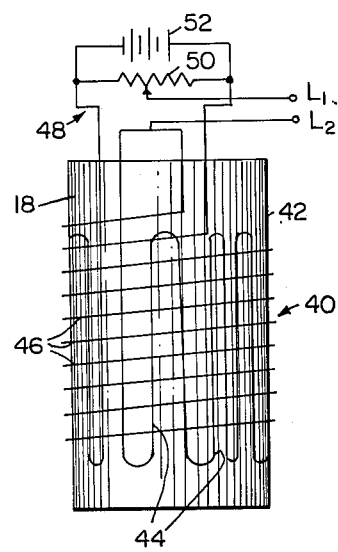
FIG. 3 is a diagrammatic and schematic view of the signal generator forming a part of the transducer of FIG. 1.

In FIG. 3 applicant has diagrammatically illustrated one manner of measuring the deflection of the elastic member 18. A bonded strain gage 40 is secured to the outer surface 42 of the elastic member 18, and the gage 40 includes a number of longitudinal strain windings 44 and a number of circumferential strain windings 46. While the windings 44 respond to the compressive stress on the elastic member 18 caused by the pressure loading, the windings 46 respond to the tensile stress which is proportional to the product of the compressive stress and Poisson's ratio. The windings 44 and 46 are connected in a bridge circuit 48 so that the bridge output represents the sum of the longitudinal and lateral strains. The bridge circuit is completed by a balancing bridge resistor 50 and a power source 52. The output signal is measured across the terminals $L_1$ and $L_2$, terminal $L_1$ being connected to the center tap of the balancing bridge resistor 50 while terminal $L_2$ is connected to the junction between the longitudinal and circumferential windings 44 and 46. This measurement is proportional to the deflection of the elastic member.

Because the radial limits of the effective area $A_2$ are determined by the profile of the dished portions 32 and 34 of the diaphragm, some change in area $A_2$ results with diaphragm displacement even though elastic members 18 and 20 deflect the same amount because the profile of the dished portion 34 changes with deflection of the member 20. As the diaphragm 14 shown in FIG. 1 deflects upwardly under a load applied to its lower surface, the line of deepest penetration 34′ of the dished portion 34 will move radially inwardly toward the member 20 and reduce the effective area $A_2$. Therefore in selecting the elastic constant for the member 20 the average value of area $A_2$ over the operative range may be used as a guide. Although some change is experienced in the area $A_2$, nevertheless, this change will have only a secondary effect upon the linearity of the gage for only a negligible difference in the amounts of deflection of the two elastic members results from the slight change in area $A_2$.

While the use of a second elastic member 20 primarily serves to maintain constant the effective area $A_1$ of the diaphragm 14 which loads the elastic member 18, certain secondary advantages are achieved by its use, which are of substantial importance. For example, when the frame 10 is threaded into an opening in the wall of a chamber containing the fluid whose pressure is to be measured, mechanical stresses etc. are applied to the frame through the threaded lower portion 12 which may distort the diaphragm 14 and introduce errors into the measurement. The outer elastic member 20 serves as a barrier to prevent those stresses on the frame from being applied to the portion $A_1$ of the diaphragm whose deflection is being sensed. The member 20 may also serve as a heat barrier to maintain the temperature of the member 18 at a uniform value and avoid temperature errors.

In FIG. 1 the outer elastic member 20 is shown to be longer than the inner member 18. The shorter elastic restraining member 18 will have a larger stress concentration which is desirable to increase the output of the strain gage bonded to it. As shown in FIG. 1 the disc 54 is depressed at its center to serve as a backup for the inner tube 18 which is substantially shorter than the outer member 20.

Having described this invention in detail those skilled in the art will appreciate that numerous modifications may be made of the illustrated embodiment without departing from its spirit. For example, the elastic members 18 and 20 can take any form. Because modifications readily suggest themselves to one skilled in the art we do not tend to limit the breadth of this invention to the single embodiment illustrated and described. Rather, we intend that the breadth of this invention be determined by the appended claims and their equivalents.

What is claimed is:

1. A pressure transducer comprising
a frame,
a diaphragm extending across and closing one end of the frame,
a first generally cylindrical elastic restraining member spaced from the inner surface of the frame and supporting the diaphragm inwardly of the frame,
a second cylindrical elastic restraining member concentric with the first member and supporting the central circular portion of the diaphragm inwardly of the first member,
said first and second members supporting the diaphragm with annular dished portions between the first member and the frame and between the first and second members, said first and second members having spring constants $K_1$ and $K_2$ bearing the relationship $$K_1/A_1 = K_2/A_2$$

wherein $A_1$ is the effective area of the portion of the diaphragm supported by the first member and $A_2$ is the effective area of the portion of the diaphragm supported by the second member,
and means including a circuit operatively connected to the second restraining member for rendering a signal which is a function of the deflection of the diaphragm.

2. A pressure transducer as defined in claim 1 further characterized by
the ends of the first and second restraining members being secured to the diaphragms.

3. A pressure transducer comprising
a frame open at one end and a thin flexible diaphragm extending across that end and closing the frame,
a first restraining means having a flat lower portion secured to the central portion of the diaphragm,
a second restraining means concentric with and surrounding the first means and having its lower edge secured to the diaphragm intermediate the first means and the frame,
said first and second restraining means having spring constants $K_1$ and $K_2$ bearing the relationship $$K_1/A_1 = K_2/A_2$$

wherein $A_1$ is the effective area of the portion of the diaphragm supported by the first restraining means and $A_2$ is the effective area of the portion of the diaphragm supported by the second restraining means,
and circuit means secured to the first restraining means rendering a signal proportional to its deflection.

4. A pressure transducer comprising
a frame,
a diaphragm extending across and closing one end of the frame,
a pair of concentric strain tubes secured to the frame and supporting the diaphragm with the inner of the tubes supporting the central portion of the diaphragm in a flat plane and the outer of the tubes separating the surrounding portion of the diaphragm into two dished portions,
said inner and outer tubes having spring constants $K_1$ and $K_2$ bearing the relationship $K_1/A_1 = K_2/A_2$,
wherein $A_1$ is the effective area of the portion of the diaphragm supported by the inner tube and $A_2$ is the effective area of the portion of the diaphragm supported by the outer tube,
and signal producing means operatively connected to the inner tube for rendering a signal which is a measure of the distortion of the inner tube.

5. A transducer as defined in claim 4 further characterized by
said signal producing means including strain windings wound about the inner of the tubes and forming part of a circuit which renders a signal functionally related to the deflection of the inner tube.

6. A pressure transducer comprising
a frame,
a diaphragm extending across and closing one end of the frame,
a cylindrical elastic restraining member spaced from the frame and supporting at one end the circular central portion of the diaphragm, a support within the frame surrounding the cylindrical member and supporting at one end a second portion of the diaphragm between the cylindrical restraining member and the frame, said diaphragm forming a dished annular section between the cylindrical member and the support, said support and restraining member having spring constants which cause the one end of the support to displace a distance equal to the displacement of the one end of the cylindrical elastic restraining member when pressure is applied to the diaphragm to preserve the shape of the dished annular section, and means including a circuit operatively connected to the elastic restraining member for rendering a signal which is a function of the pressure exerted on the diaphragm.

7. A pressure transducer comprising a frame, a diaphragm extending across and closing one end of the frame, an elastic restraining member within the frame and supporting at one end the circular central portion of the diaphragm, a support within the frame having an annular portion surrounding the elastic restraining member, and supporting at one end a second portion of the diaphragm between the elastic restraining member and the frame, said diaphragm forming a dished annular section between the elastic restraining member and the support, said member and support having spring constants which cause the one end of the support to displace a distance equal to the displacement of the one end of the elastic restraining member when pressure is applied to the diaphragm to preserve the shape of the dished annular section, and signal producing means operatively connected to the elastic restraining member for rendering a signal which is a measure of the displacement of the one end of said member.

References Cited by the Examiner

UNITED STATES PATENTS 2,380,983   8/1945   Mock _____ 92—103

RICHARD C. QUEISSER, *Primary Examiner.*

DAVID SCHONBERG, *Examiner.*